Patented Mar. 31, 1931

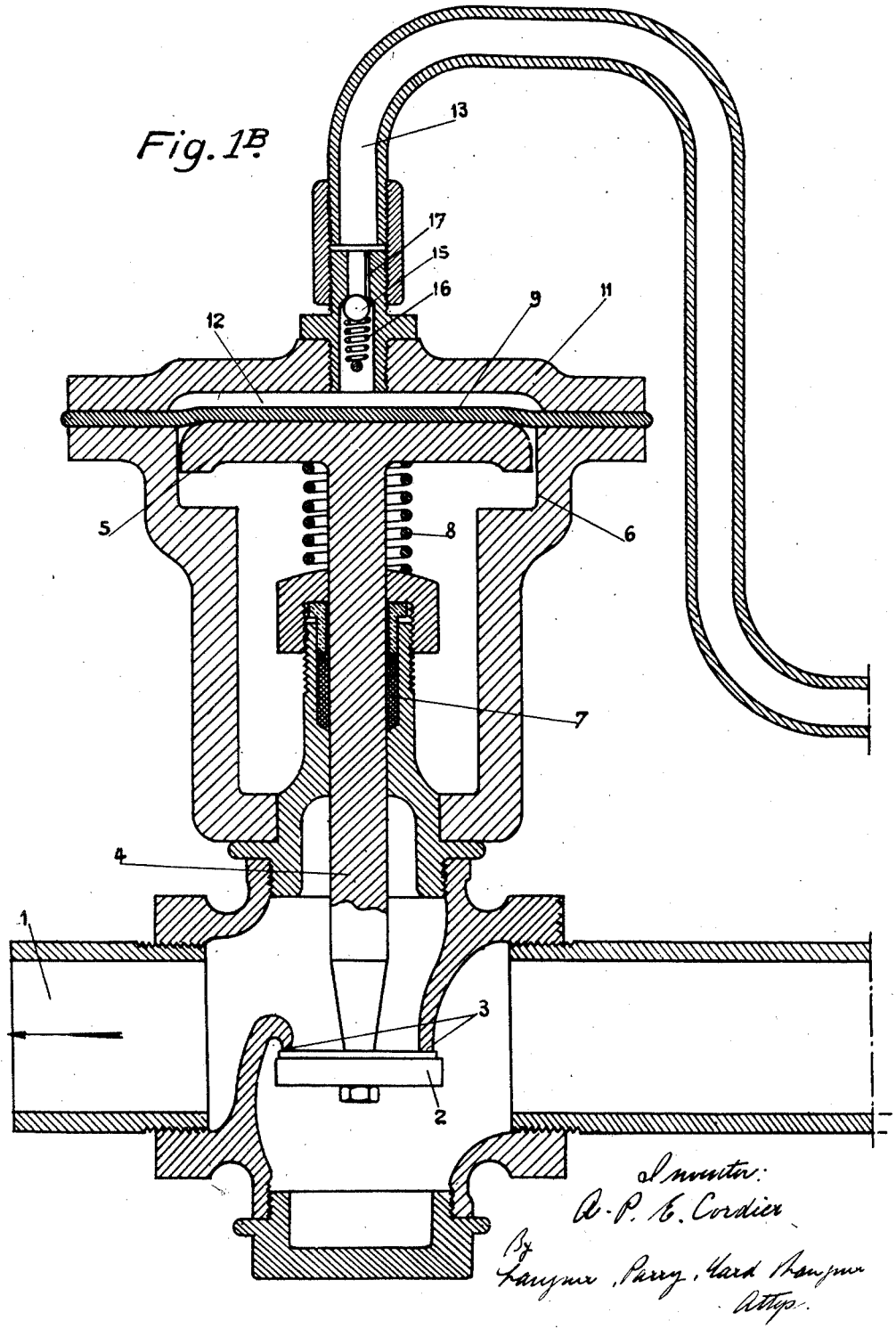

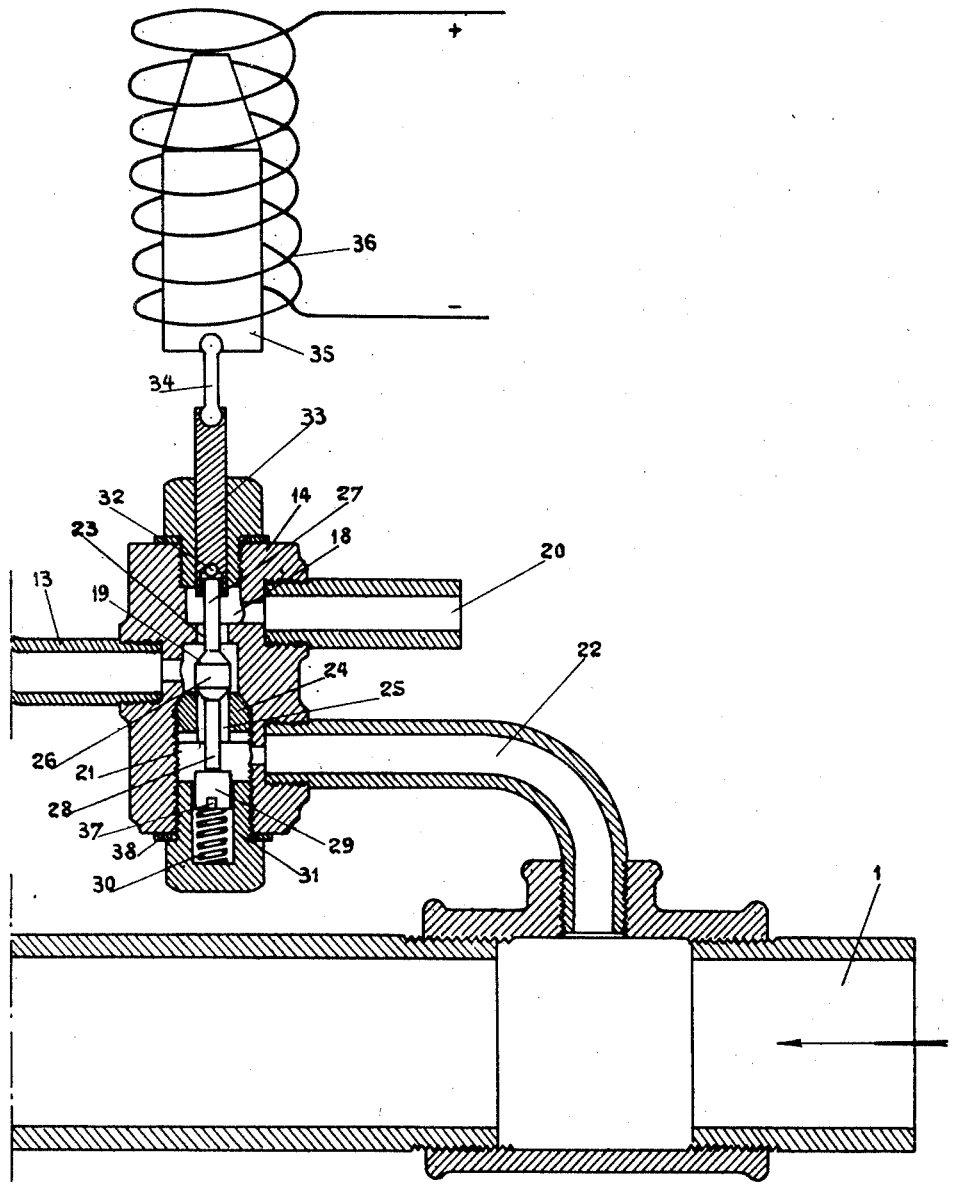

1,798,973

UNITED STATES PATENT OFFICE

ANDRÉ PAUL EMILE CORDIER, OF COURBEVOIE, FRANCE, ASSIGNOR TO ETABLISSEMENT SIPRO, OF PARIS, FRANCE, A BODY CORPORATE OF FRANCE

CONTROL DEVICE FOR VALVES

Application filed June 7, 1929, Serial No. 369,229, and in France March 20, 1929.

My invention has for its object a valve adapted to be controlled from a distance and adapted for use with any pipe feeding fluid under pressure. My improved valve may be very large and the fluid pressure very high without the control apparatuses needing to be large-sized nor their requiring a considerable output of energy.

According to my invention I use a differential valve submitted to the pressure above the said valve, the control apparatuses being fluid-tight and allowing a slow closing of the said main valve without any hammering effects produced by the fluid.

When it is desired to avoid the use of a special motor for controlling the valve, electromagnets are generally used the armature of which is suitably secured to the valve which may be of any known type. But it is not possible to use electromagnets with valves the diameter of which is above 12 to 15 m/m and working under pressures above 2 to 3 kilograms. For higher diameters or pressures, it is necessary to use very powerful and costly electromagnets, the size of which is out of proportion with that of the valve to be controlled. Their consumption of electric current is considerable chiefly in the case of alternating current and it is necessary to provide relays between the controlling device and the electromagnet together with an intricate and costly electric arrangement. Moreover the working is not perfectly regular when the fluid pressure is variable and moreover the action of the electromagnets is sudden and produces often water hammer effects.

My improved valve allows only small electromagnets to be used. An electromagnet adapted to control 5 kgs. may control in the case of the invention a valve of 7 centimeters in pipes for fluids under pressures from 0,5 to 8 kgs. whereas heretofore electromagnets having a bearing capacity from 150 to 300 kgs. would be necessary. The working of my improved valve is independent of the pressure as this pressure actuates the valve which closes as gradually as may be desired for preventing water hammer effects. The valve is also very reliable and cannot work in an untimely manner.

According to my invention the valve of any known type is secured to a piston sliding inside a cylinder and above which is a fluid-tight chamber adapted to be connected either with a point of the pipe streamupwards with reference to the valve or with the atmosphere under the action of a distributor working under the action of a small control device such as an electromagnet, a fluid under pressure or the like. No stuffing box is required so as to avoid the considerable frictional action which would be produced thereby in the distributor.

I have shown by way of example on accompanying drawing a form of execution of my invention wherein the valve is electromagnetically controlled.

Fig. 1A of the drawings shows the right side of the valve including the distributor, in cross section; and Fig. 1B shows the left side of the valve, that is the valve proper, in cross section.

The valve disposed in the pipe 1 comprises a valve head 2 adapted, when closed, to bear against its seat 3 and to which is secured the rod 4 of a piston 5 moving inside a cylinder 6. The rod 4 passes through a stuffing box 7 adjusted so as to keep the device watertight in spite of the pressure in the pipe; a spring 8 powerful enough to overcome the friction due to the stuffing box 7, urges the piston 5 upwards so as to close the valve.

Over the upper surface of the piston 5 is disposed a diaphragm 9, metallic or otherwise the edge of which is pinched between the surfaces separating the cylinder 6 and its cover 11, which latter is slightly dished so as to provide above the diaphragm 9 a perfectly fluidtight chamber 12.

In this chamber opens the pipe 13 connected with the distributor 14. The opening of the pipe 13 into the chamber 12 is closed by a ball valve 15 urged against its seat by a spring 16. A very narrow duct 17 keeps the chamber 12 in permanent connection with the pipe 13.

It should be noted that the valve comprises a single stuffing box 7 which may be held as tightly as may be desired, due to the fact that the action on the piston the value of which depends on the strength of the spring 8 and on the diameter of the cylinder 6 may be increased according to requirements.

All the other joints are stationary and their fluidtightness is ensured by pressing between the cooperating parts, for instance between the cover and the body of the cylinder 6, washers of suitable material such as rubber, lead, leather and the like.

The distributor 14 comprises three chambers 18, 19 and 21. The upper chamber 18 is connected with the atmosphere through the pipe 20, the central chamber 19 with the pipe 13 and the lower chamber 21 with a pipe 22 connected in its turn with the pipe 1 at a point streamupwards with reference to the valve 2.

The chambers 18 and 19 are connected together through the duct 23 whereas the chamber 19 is separated from the chamber 21 by a threaded plug 24 provided with an aperture 25 having a cross-section equal to that of duct 23.

The connections between the central and the outer chambers are controlled by a double frustoconical valve 26 provided with two rods 27 and 28 adapted to pass freely without any friction through the guiding ducts 23 and 25. To the rod 28 is secured a head 29 adapted to slide without substantial friction inside the cylinder 31 and submitted to the action of the spring 30 disposed between the head 29 and the bottom of the cylinder 31. This spring urges the valve 26 upwards so as to close the connection between the chambers 19 and 18 i. e. between the pipes 13 and 20; the pipes 13 and 22 remain on the contrary in communication through the chambers 19 and 21.

On the upper end of the rod 27 rests with the interposition of a ball 32, a rod 33 which is connected through a connecting rod 34 with the plunger core 35 of the electromagnet 36.

It should be noted that no stuffing box is used for the distributor and the joints may all be provided with washers fitted tightly between the cooperating parts whereby perfect fluidtightness is secured whatever fluid passes through the pipe 1 and whatever its pressure may be. However it is necessary that the valve 26 may bear very accurately against its seat and that it should be well ground in at the mounting.

This is provided by removing the plug 24 and the cylinder 31 and then inserting the valve 26 with its rods 27 and 28, the plug 24 being thereafter screwed again in its recess, the head 29 being screwed finally over its rod; this head 29 is provided with a slit adapted for engagement by a screwdriver which rotates the valve 26 for grinding it in on its seat. The valve is urged against the end of the duct 23 by the action of the screwdriver itself and against the surface of the plug 24 by the rod 32. Thus it is possible to obtain a perfect and fluidtight bearing between the cones of the valve and their seats. When this grinding in has been provided for the cylinder 31 with its spring 30 is secured to the distributor body with the interposition of the washer 38.

The working is as follows: When the electromagnet 36 is not energized, the weight of the core 35, of the connecting rod 34 and of the rod 33 is sufficient for keeping the valve 26 against its lower seat i. e. the plug 25 so as to close the connection between the pipes 22 and 13. If the fluid were to leak round the valve 26 this would be of no importance as the fluid would pass freely into the chamber 18 and from there into the atmosphere through the pipe 20. On the contrary when the electromagnet is energized, it attracts its core, whereupon the valve 26 is raised by the spring 30 and shuts the communication between pipes 13 and chamber 18 and on the contrary connects the pipes 13 and 22.

The fluid from the pipe 1 passes through said pipes 13 and 22 and its pressure causes the valve 26 to bear against its upper seat so as to prevent any communication with the atmosphere.

When the fluid arrives at the end of the pipe 13 it presses against the ball valve 15 and enters the chamber 12. It presses therein against the diaphragm 9 on the piston 5 and if the cross sectional area of said piston is sufficient it may overcome the action of the spring and of the counterpressure exerted on the valve 2 the surface of which is smaller than that of the piston 4. The valve 2 opens therefore and the fluid passes freely through the pipe 1.

As soon as the electromagnet is deenergized the valve 26 falls and provides a connection between the chamber 12 and the atmosphere and the fluid passing consequently out of chamber 12 cooperates with the spring 16 for returning the ball 15 on its seat. The fluid continues escaping slowly out of the chamber 12 through the narrow duct 17 and the valve 2 cannot therefore fall suddenly on its seat and its gradual return thereto prevents any water hammer effects.

What I claim is:

1. A pipe valve arrangement comprising a main pipe for fluids under pressure, a valve head adapted to control the flow of fluid through said pipe, a piston secured thereto, a cylinder wherein said piston is adapted to slide, a fluid-tight diaphragm bearing on the side of the piston opposed to the valve head and forming a chamber with the corresponding end of the cylinder, a three way auxiliary valve, a branch pipe connecting the diaphragm chamber with one way of the auxiliary valve, a ball valve at the opening of the branch pipe into the chamber, a seat therefor provided with a narrow duct for permanent connection between the chamber and branch pipe, means urging the ball valve on its seat against the action of the pressure in the branch pipe, means connecting the other ways of the said auxiliary valve with the atmosphere and with the main pipe at a point streamupwards with reference to the valve head and means for controlling from a distance the connections between the first way and the two other ways in the valve.

2. A pipe valve arrangement comprising a main pipe for fluids under pressure, a valve head adapted to control the flow of fluid through said pipe a piston secured thereto, a cylinder wherein said piston is adapted to slide, a fluid-tight diaphragm bearing on the side of the piston opposed to the valve head and forming a chamber with the corresponding end of the cylinder, a distributor having three interconnected chambers, a branch pipe connecting the diaphragm chamber with the central distributor chamber, a ball valve controlling the branch pipe, a seat therefor provided with a narrow duct for permanent connection between the two sides of the valve, means urging the ball valve on its seat against the action of the pressure in the distributor, two opposed valve seats in the central distributor chamber at the opening of the connections with the outer chambers, a double auxiliary valve adapted to move between the two said seats, pipes connecting the outer distributor chambers respectively with the atmosphere and with the main pipe streamupwards with reference to the valve head and means controlling from a distance the auxiliary valve.

3. A pipe valve arrangement comprising a main pipe for fluids under pressure, a valve head adapted to control the flow of fluid through said pipe, a piston secured thereto, a cylinder wherein said piston is adapted to slide, a fluid-tight diaphragm bearing on the side of the piston opposed to the valve head and forming a chamber with the corresponding end of the cylinder, a distributor having three chambers and a duct connecting the central distributor chamber with another chamber, a threaded plug separating the central chamber from the last chamber and provided with a duct connecting said chambers, seats formed at the opening of the ducts into the central chamber, a branch pipe connecting the diaphragm chamber with the central distributor chamber, a double frustoconical valve adapted to move between the two seats in the central distributor chamber, a rod for said valve passing through the ducts of the distributor and plug, pipes connecting the outer distributor chambers respectively with the atmosphere and with the main pipe streamupwards with reference to the valve head and means controlling from a distance the auxiliary valve.

4. A pipe valve arrangement comprising a main pipe for fluids under pressure, a valve head adapted to control the flow of fluid through said pipe, a piston secured thereto, a cylinder wherein said piston is adapted to slide, a fluidtight diaphragm bearing on the side of the piston opposed to the valve head and forming a chamber with the corresponding end of the cylinder, a distributor having three chambers and a duct connecting the central distributor chamber with another chamber, a threaded plug separating the central chamber from the last chamber and provided with a duct connecting said chambers, seats formed at the opening of the ducts into the central chamber, a branch pipe connecting the diaphragm chamber with the central distributor chamber, a double frusto-conical valve adapted to move between the two seats in the central distributor chamber, a rod for said valve passing through the ducts of the distributor and plug, pipes connecting the outer distributor chambers respectively with the atmosphere and with the main pipe streamupwards with reference to the valve head a spring urging the auxiliary valve rod upwards means for allowing its rotation by hand on the lower end of the valve rod and a small electromagnet adapted when energized to raise the valve rod.

5. A pipe valve arrangement comprising a main pipe for fluids under pressure, a valve head adapted to control the flow of fluid through said pipe, a piston secured thereto, a cylinder wherein said piston is adapted to slide, a fluidtight diaphragm bearing on the side of the piston opposed to the valve head and forming a chamber with the corresponding end of the cylinder a distributor having three chambers and a duct connecting the central distributor chamber with another chamber, a threaded plug separating the central chamber from the last chamber and provided with a duct connecting said chambers, seats formed at the opening of the ducts into the central chamber, a branch pipe connecting the diaphragm chamber with the central distributor chamber, a ball valve at the opening of the branch pipe into the diaphragm chamber, a seat therefor provided with a narrow duct for permanent connection between the diaphragm chamber and branch pipe, means urging the ball valve on its seat against the action of the pressure in the branch pipe, a double frusto-conical valve adapted to move between the two seats in the central distributor chamber, a rod for said valve passing through the ducts of the distributor and plug, pipes connecting the outer distributor chambers respectively with the atmosphere and with the main pipe streamupwards with reference to the valve head a spring urging the auxiliary valve rod upwards and a small electromagnet adapted when energized to raise the valve rod.

In testimony whereof I have signed my name to this specification.

ANDRÉ PAUL EMILE CORDIER.